US010264320B2

(12) United States Patent
Gibbons et al.

(10) Patent No.: US 10,264,320 B2
(45) Date of Patent: Apr. 16, 2019

(54) ENABLING USER INTERACTIONS WITH VIDEO SEGMENTS

(71) Applicant: Microsoft Technology Licensing, LLC, Redmond, WA (US)

(72) Inventors: Kirk Christopher Gibbons, North Vancouver (CA); David Seymour, Vancouver (CA); Preetinderpal Singh Mangat, Surrey (CA); William Michael Mozell, North Vancouver (CA); William Ben Hanke, Vancouver (CA); Dashan Yue, Vancouver (CA); Jeremy Bruce Kersey, Vancouver (CA); Henry Stuart Denison Watson, Vancounver (CA); Enrico William Guld, Vancouver (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 703 days.

(21) Appl. No.: 14/602,083

(22) Filed: Jan. 21, 2015

(65) Prior Publication Data
US 2015/0355826 A1    Dec. 10, 2015

Related U.S. Application Data

(60) Provisional application No. 62/010,368, filed on Jun. 10, 2014.

(51) Int. Cl.
*H04N 21/431* (2011.01)
*H04N 21/845* (2011.01)
(Continued)

(52) U.S. Cl.
CPC ....... *H04N 21/47205* (2013.01); *A63F 13/00* (2013.01); *G06F 3/048* (2013.01); *H04N 21/4781* (2013.01)

(58) Field of Classification Search
CPC ......... G06F 3/017; G06F 3/011; A63F 13/213
See application file for complete search history.

(56) References Cited

U.S. PATENT DOCUMENTS 5,708,845 A * 1/1998 Wistendahl ....... G06F 17/30014
                                                    348/E5.108
7,749,089 B1   7/2010 Briggs et al.
(Continued)

OTHER PUBLICATIONS

Carlier, et al., "Ask'nSeek: A New Game for Object Detection and Labeling", In Proceedings of the 12th International Conference on Computer Vision—vol. Part I, Oct. 7, 2012, 2 pages.
(Continued)

*Primary Examiner* — Jordany Nunez
(74) *Attorney, Agent, or Firm* — Alleman Hall Creasman & Tuttle LLP

(57) ABSTRACT

Embodiments described herein enable user interaction with a video segment. A hit-zone file, which includes hit-zone data, is produced and stored for a video segment, wherein the hit-zone data corresponds to spatial regions that define hit-zones for hidden objects included in the video segment. The hit-zone file is provided to a computing system so that when the computing system displays the video segment the hit-zone file adds hit-zones for the hidden objects included in the video segment. The hit-zone file is produced separate from the video segment. Each of the hit-zones is defined by a different portion of the hit-zone data and corresponds to a different one of the hidden objects included in the video segment. The spatial regions that define the hit-zones for hidden objects are not visible to a user of the computing
(Continued)

system that views the video segment with the hit-zones added.

12 Claims, 10 Drawing Sheets

(51) Int. Cl.
*G06F 3/0346* (2013.01)
*H04N 21/4784* (2011.01)
*H04N 21/472* (2011.01)
*G06F 3/048* (2013.01)
*A63F 13/00* (2014.01)
*H04N 21/478* (2011.01)

(56) References Cited

U.S. PATENT DOCUMENTS

| | | | |
|---|---|---|---|
| 8,469,794 B2 | 6/2013 | Roukis et al. | |
| 9,319,366 B2 * | 4/2016 | Kim | H04L 51/18 |
| 2004/0221262 A1 * | 11/2004 | Hampapuram | G06F 8/33 |
| | | | 717/113 |
| 2007/0260987 A1 * | 11/2007 | Mohoney | G06F 17/30855 |
| | | | 715/723 |
| 2009/0061970 A1 | 3/2009 | Wylie et al. | |
| 2009/0062007 A1 * | 3/2009 | Chihaya | A63F 13/10 |
| | | | 463/42 |
| 2010/0027961 A1 * | 2/2010 | Gentile | G06T 5/50 |
| | | | 386/278 |
| 2012/0126973 A1 | 5/2012 | DeAngelis et al. | |
| 2012/0304225 A1 * | 11/2012 | Ritter | H04N 21/25866 |
| | | | 725/35 |
| 2013/0303276 A1 | 11/2013 | Weston et al. | |
| 2013/0324247 A1 * | 12/2013 | Esaki | H04N 21/4312 |
| | | | 463/31 |
| 2014/0058812 A1 | 2/2014 | Bender et al. | |
| 2014/0196066 A1 * | 7/2014 | Wu | G06F 17/30017 |
| | | | 725/14 |
| 2018/0027282 A1 * | 1/2018 | Hirschfeld | H04N 21/4318 |
| | | | 715/716 |

OTHER PUBLICATIONS

Sarkar, Samit, "2014 World Cup arrives on Xbox One with Destination Brazil", Published on: Jun. 2, 2014, Available at: http://www.polygon.com/2014/6/2/5771864/world-cup-2014-xbox-one-app-destination-brazil-every-street-united.

Feng, et al., "Purposive Hidden-Object-Game: Embedding Human Computation in Popular Game", In Proceedings of the IEEE Transactions on Multimedia, vol. 14, Issue 5, Oct. 2012, 12 pages.

* cited by examiner

US 10,264,320 B2

ENABLING USER INTERACTIONS WITH VIDEO SEGMENTS

PRIORITY CLAIM

This application claims priority to U.S. Provisional Patent Application No. 62/010,368, filed Jun. 10, 2014, which is incorporate herein by reference.

BACKGROUND

In the past, televisions were primarily used to passively view broadcasted television shows that included moving images and sound. Over the past few decades, VCRs, DVD players, and DVRs enabled user's to passively view pre-recorded video segments. Even more recently, smart televisions and other devices including displays have enabled users to view streaming video segments and download video segments for viewing on demand. Additionally, televisions, as well as other types of displays, have been connected to video game consoles and/or other computing systems to provide users with a more interactive experiences, which have typically involved playing video games. When not being used to play video games, many video game consoles and/or other computing systems are capable of displaying video segments, and are often used in place of DVD players or DVRs. However, when video game consoles and/or other computing systems are used to view video segments, the viewing of the video segments is still typically a completely passive experience for the users. More specifically, there is typically no opportunity for a user viewing a video segment to interact with the video segment.

SUMMARY

Embodiments of the present technology, which are described below, enable user interactions with a video segment. Accordingly, such embodiments provide for an enhanced user experience, which is beneficial to the user, and is also beneficial to the provider (e.g., producer and/or distributor) of the video segment where their goal is to increase user interest in their video segment. Such embodiments also enable third parties, which did not produce the video segments, to provide additional content and user interaction not provided by the producers of the video segments. More specifically, certain embodiments of the present technology generally relate to hidden object games, methods for providing hidden object games, and systems for providing hidden object games.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Certain embodiments of the present technology relate to methods and systems that enable user interactions with video segments. More specifically, certain embodiments of the present technology provide the ability to manually identify and store stationary or moving object locations found in a video segment to enable a game construct where a user can search for and discover objects (referred to as hidden objects) at a later time upon video playback. The video segment can be a streaming, looping, or pre-recorded video, but is not limited thereto, as will be described in additional detail below. Hidden objects, as the term is used herein, refers to objects that are included in a video segment and have been indicated to be objects that a user watching the video segment is instructed to identify. Hidden objects, as the term is used herein, are not completely obscured from being viewed by a user viewing a video segment that includes the hidden objects. Hidden objects may be partially obscured. However, for at least a portion of a video segment each of the hidden objects is at least partially viewable to a user viewing the video segment that includes the hidden objects.

An exemplary system that can be used to implement embodiments of the present technology will now be described with reference to the attached drawings, which in general relate to a gaming and media system (or other computing system) with which a user can play video games, watch videos, and/or interact with other types of applications. A user may interact with these applications using a variety of interfaces including for example a computer having an input device such as a mouse, a gaming device having an input device such as a controller or a natural user interface (NUI). With NUI, user movements and gestures are detected, interpreted and used to control aspects of a gaming or other application.

Figure 1A:
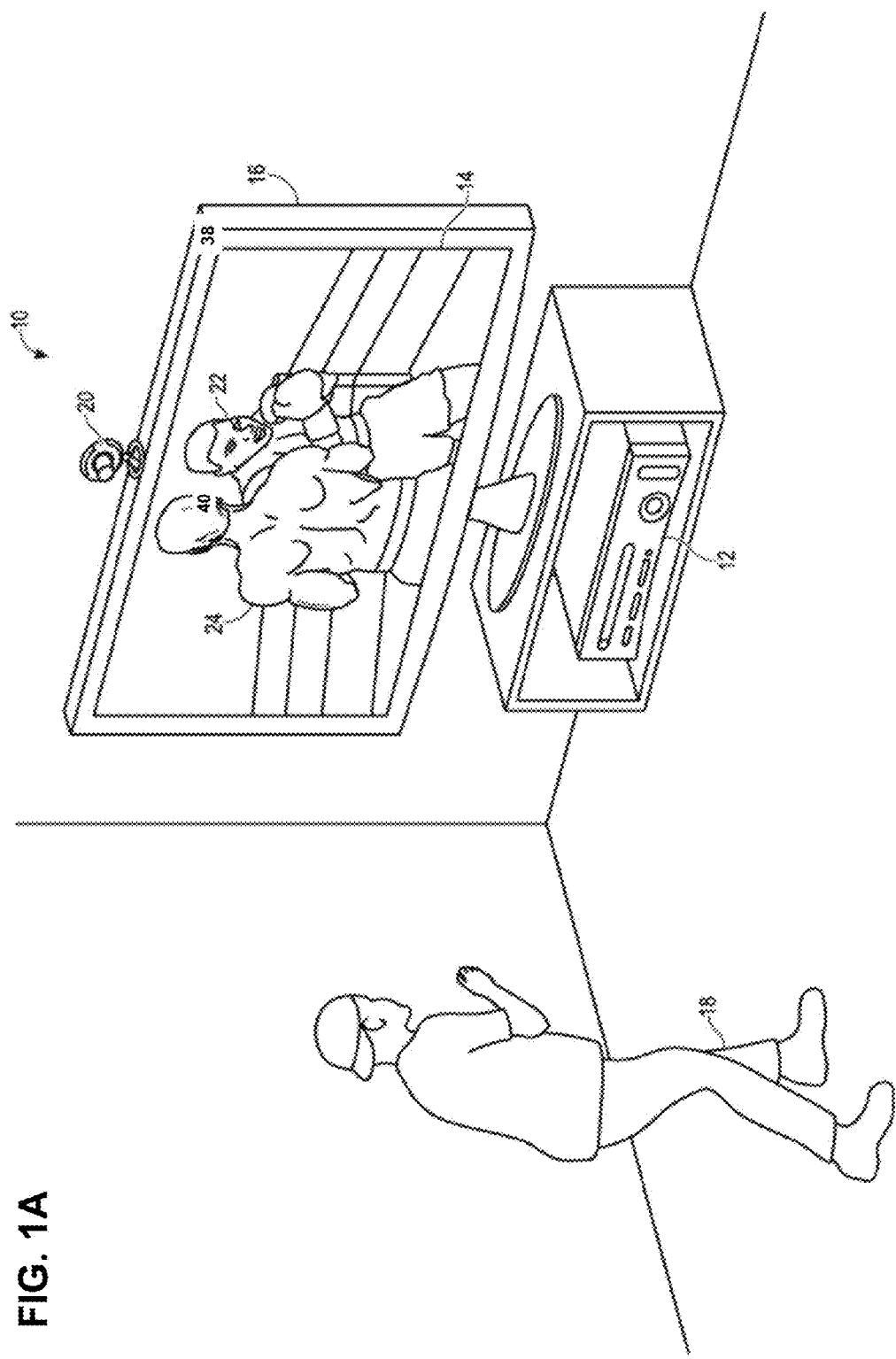
FIGS. 1A and 1B illustrate an example embodiment of a tracking system with a user playing a game.
Figure 1B:
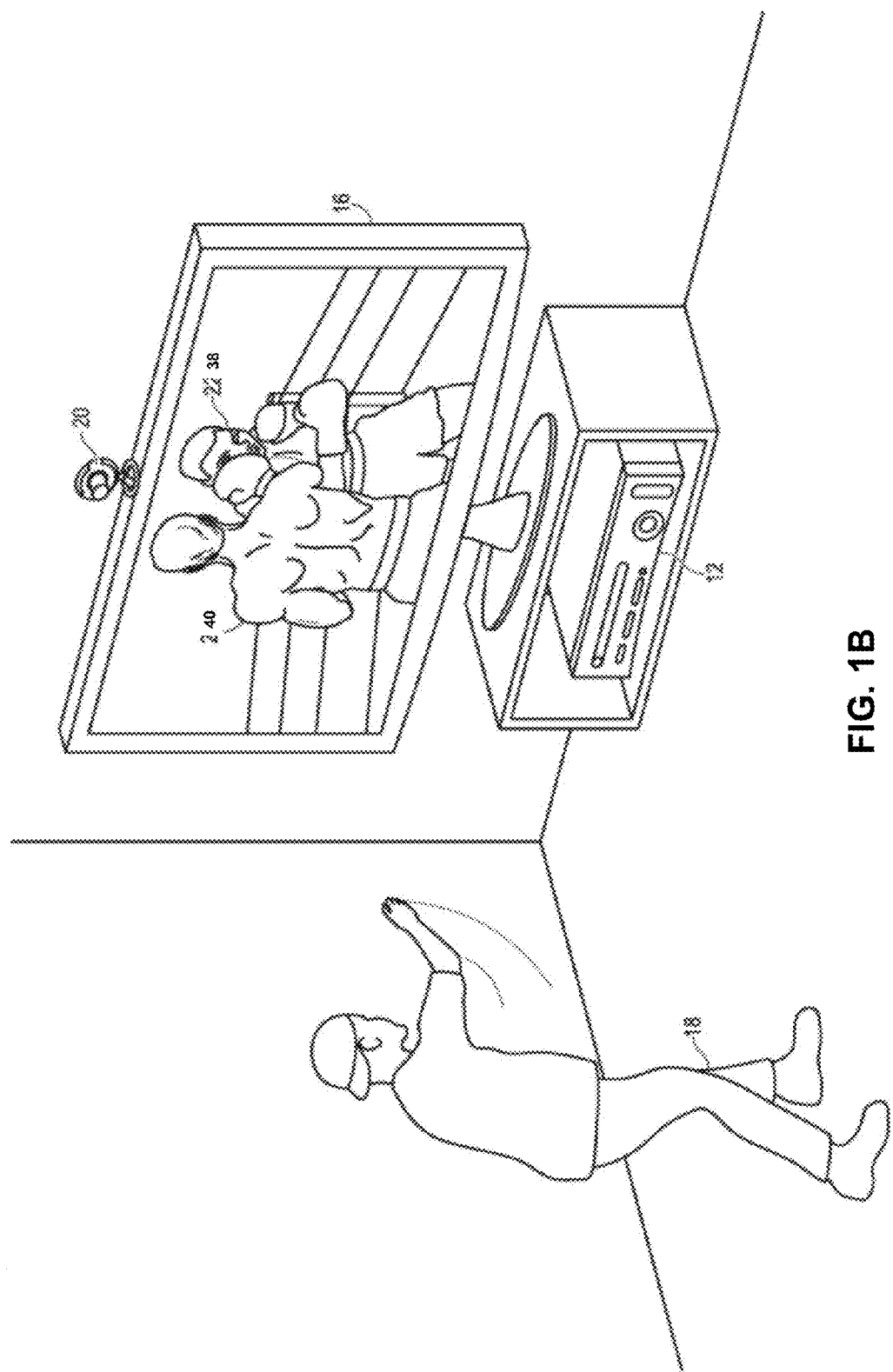

FIGS. 1A and 1B illustrate an example embodiment of a NUI system 10 with a user 18 playing a boxing game. In an example embodiment, the system 10 may be used to recognize, analyze, and/or track a human target such as the user 18 or other objects within range of tracking system 10.

As shown in FIG. 1A, tracking system 10 may include a computing system 12. The computing system 12 may be a computer, a gaming system or console, or the like. According to an example embodiment, the computing system 12 may include hardware components and/or software components such that computing system 12 may be used to execute applications such as gaming applications, non-gaming applications, or the like. In one embodiment, computing system 12 may include a processor such as a standardized processor, a specialized processor, a microprocessor, or the like that may execute instructions stored on a processor readable storage device for performing the processes described herein.

As shown in FIG. 1A, tracking system 10 may further include a capture device 20. The capture device 20 may be, for example, a camera that may be used to visually monitor one or more users, such as the user 18, such that gestures and/or movements performed by the one or more users may be captured, analyzed, and tracked to perform one or more controls or actions within the application and/or animate an avatar or on-screen character, as will be described in more detail below.

According to one embodiment, the tracking system 10 may be connected to an audiovisual device 16 such as a television, a monitor, a high-definition television (HDTV), or the like that may provide game or application visuals and/or audio to a user such as the user 18. For example, the computing system 12 may include a video adapter such as a graphics card and/or an audio adapter such as a sound card that may provide audiovisual signals associated with the game application, non-game application, or the like. The audiovisual device 16 may receive the audiovisual signals from the computing system 12 and may then output the game or application visuals and/or audio associated with the audiovisual signals to the user 18. According to one embodiment, the audiovisual device 16 may be connected to the computing system 12 via, for example, an S-Video cable, a coaxial cable, an HDMI cable, a DVI cable, a VGA cable, component video cable, or the like. The audiovisual device 16 can also be referred to more generally as a display device, or more simply as a display.

As shown in FIGS. 1A and 1B, the tracking system 10 may be used to recognize, analyze, and/or track a human target such as the user 18. For example, the user 18 may be tracked using the capture device 20 such that the gestures and/or movements of user 18 may be captured to animate an avatar or on-screen character and/or may be interpreted as controls that may be used to affect the application being executed by computer system 12. Thus, according to one embodiment, the user 18 may move his or her body to control the application and/or animate the avatar or on-screen character.

In the example depicted in FIGS. 1A and 1B, the application executing on the computing system 12 may be a boxing game that the user 18 is playing. For example, the computing system 12 may use the audiovisual device 16 to provide a visual representation of a boxing opponent 38 to the user 18. The computing system 12 may also use the audiovisual device 16 to provide a visual representation of a player avatar 40 that the user 18 may control with his or her movements. For example, as shown in FIG. 1B, the user 18 may throw a punch in physical space to cause the player avatar 40 to throw a punch in game space. Thus, according to an example embodiment, the computer system 12 and the capture device 20 recognize and analyze the punch of the user 18 in physical space such that the punch may be interpreted as a game control of the player avatar 40 in game space and/or the motion of the punch may be used to animate the player avatar 40 in game space.

Other movements by the user 18 may also be interpreted as other controls or actions and/or used to animate the player avatar, such as controls to bob, weave, shuffle, block, jab, or throw a variety of different power punches. Furthermore, some movements may be interpreted as controls that may correspond to actions other than controlling the player avatar 40. For example, in one embodiment, the player may use movements to end, pause, or save a game, select a level, view high scores, communicate with a friend, etc. According to another embodiment, the player may use movements to select the game or other application from a main user interface. Thus, in example embodiments, a full range of motion of the user 18 may be available, used, and analyzed in any suitable manner to interact with an application.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game. Objects not held by the user can also be tracked, such as objects thrown, pushed or rolled by the user (or a different user) as well as self propelled objects. In addition to boxing, other games can also be implemented.

According to other example embodiments, the tracking system 10 may further be used to interpret target movements as operating system and/or application controls that are outside the realm of games. For example, virtually any controllable aspect of an operating system and/or application may be controlled by movements of the target such as the user 18.

Figure 2:
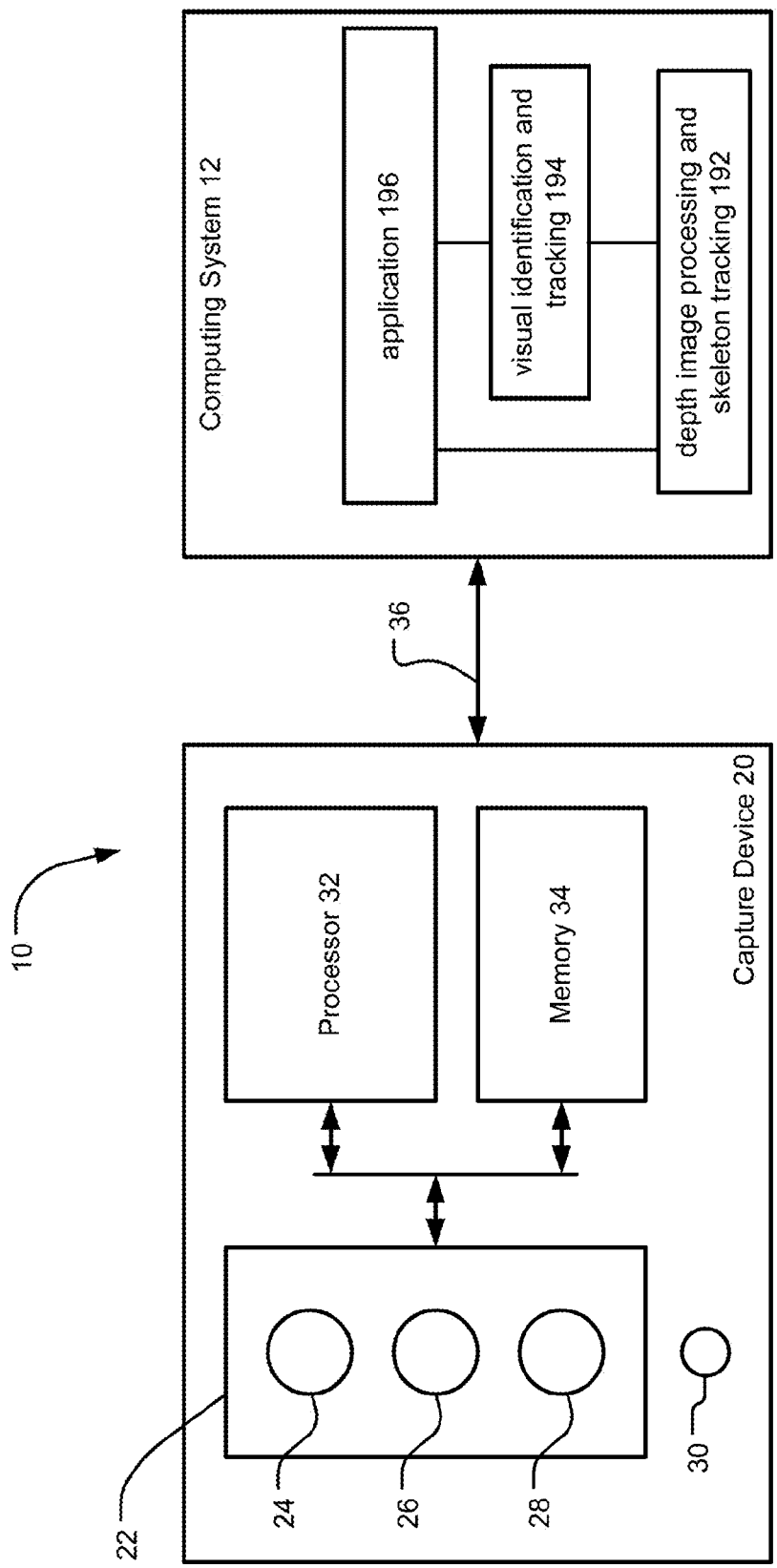
FIG. 2 illustrates an example embodiment of a capture device that may be used as part of the tracking system.

FIG. 2 illustrates an example embodiment of the capture device 20 that may be used in the tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 2, the capture device 20 may include an image capture component 22. According to an example embodiment, the image capture component 22 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2, according to an example embodiment, the image capture component 22 may include an infra-red (IR) light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern, a stripe pattern, or different pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 (and/or other sensor) and may then be analyzed to determine a physical distance from the capture device to a particular location on the targets or objects. In some implementations, the IR Light component 24 is displaced from the cameras 24 and 26 so triangulation can be used to determined distance from cameras 24 and 26. In some implementations, the capture device 20 will include a dedicated IR sensor to sense the IR light, or a sensor with an IR filter.

According to another embodiment, the capture device 20 may include two or more physically separated cameras that may view a scene from different angles to obtain visual stereo data that may be resolved to generate depth information. Other types of depth image sensors can also be used to create a depth image.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing system 12 in the target recognition, analysis, and tracking system 10. Additionally, the microphone 30 may be used to receive audio signals that may also be provided by the user to control applications such as game applications, non-game applications, or the like that may be executed by the computing system 12.

In an example embodiment, the capture device 20 may further include a processor 32 that may be in communication with the image capture component 22. The processor 32 may include a standardized processor, a specialized processor, a microprocessor, or the like that may execute instructions including, for example, instructions for receiving a depth image, generating the appropriate data format (e.g., frame) and transmitting the data to computing system 12.

The capture device 20 may further include a memory component 34 that may store the instructions that are executed by processor 32, images or frames of images captured by the 3-D camera and/or RGB camera, or any other suitable information, images, or the like. According to an example embodiment, the memory component 34 may include random access memory (RAM), read only memory (ROM), cache, flash memory, a hard disk, or any other suitable storage component. As shown in FIG. 2, in one embodiment, memory component 34 may be a separate component in communication with the image capture component 22 and the processor 32. According to another embodiment, the memory component 34 may be integrated into processor 32 and/or the image capture component 22.

As shown in FIG. 2, capture device 20 may be in communication with the computing system 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing system 12 may provide a clock to the capture device 20 that may be used to determine when to capture, for example, a scene via the communication link 36. Additionally, the capture device 20 provides the depth information and visual (e.g., RGB) images captured by, for example, the 3-D camera 26 and/or the RGB camera 28 to the computing system 12 via the communication link 36. In one embodiment, the depth images and visual images are transmitted at 30 frames per second. The computing system 12 may then use the model, depth information, and captured images to, for example, control an application such as a game or word processor and/or animate an avatar or on-screen character.

Computing system 12 includes depth image processing and skeleton tracking 192, visual identification and tracking module 194 and application 196. Depth image processing and skeleton tracking 192 uses the depth images to track motion of objects, such as the user and other objects. To assist in the tracking of the objects, depth image processing and skeleton tracking 192 uses a gestures library and structure data to track skeletons. The structure data includes structural information about objects that may be tracked. For example, a skeletal model of a human may be stored to help understand movements of the user and recognize body parts. Structural information about inanimate objects may also be stored to help recognize those objects and help understand movement. The gestures library may include a collection of gesture filters, each comprising information concerning a gesture that may be performed by the skeletal model (as the user moves). The data captured by the cameras 26, 28 and the capture device 20 in the form of the skeletal model and movements associated with it may be compared to the gesture filters in the gesture library to identify when a user (as represented by the skeletal model) has performed one or more gestures. Those gestures may be associated with various controls of an application. Visual images from capture device 20 can also be used to assist in the tracking.

Visual identification and tracking module 194 is in communication with depth image processing and skeleton tracking 192, and application 196. Visual identification and tracking module 194 visually identifies whether a person who has entered a field of view of the system is a player who has been previously interacting with the system, as described below. Visual identification and tracking module 194 will report that information to application 196.

Application 196 can be a video game, productivity application, etc. Application 196 may be any of the mini-guide application, jump bar application, smart view application and/or prediction application described in greater detail hereinafter. Application 196 may further be an application for accessing content from one or more Web servers via a network such as the Internet. As one example, application 196 may be an application available from the ESPN® sports broadcasting service. Other examples are contemplated. In one embodiment, depth image processing and skeleton tracking 192 will report to application 196 an identification of each object detected and the location of the object for each frame. Application 196 will use that information to update the position or movement of an avatar or other images in the display.

Figure 3:
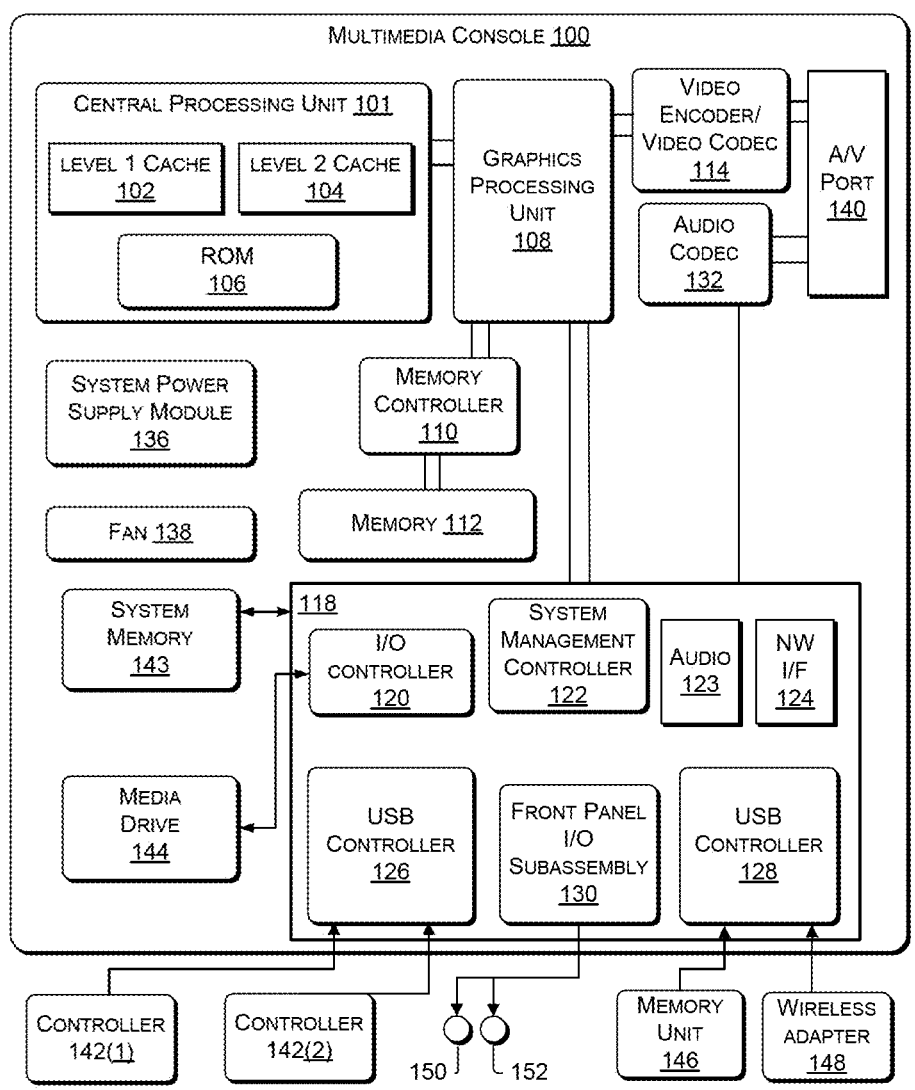
FIG. 3 illustrates an example embodiment of a computing system that may be used to track motion and update an application based on the tracked motion.

FIG. 3 illustrates an example embodiment of a computing system that may be the computing system 12 shown in FIGS. 1A-2 used to track motion and/or animate (or otherwise update) an avatar or other on-screen object displayed by an application. The computing system such as the computing system 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, Blu-Ray drive, hard disk drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the AN port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application uses audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100 via USB controller 126 or other interface.

Figure 4:
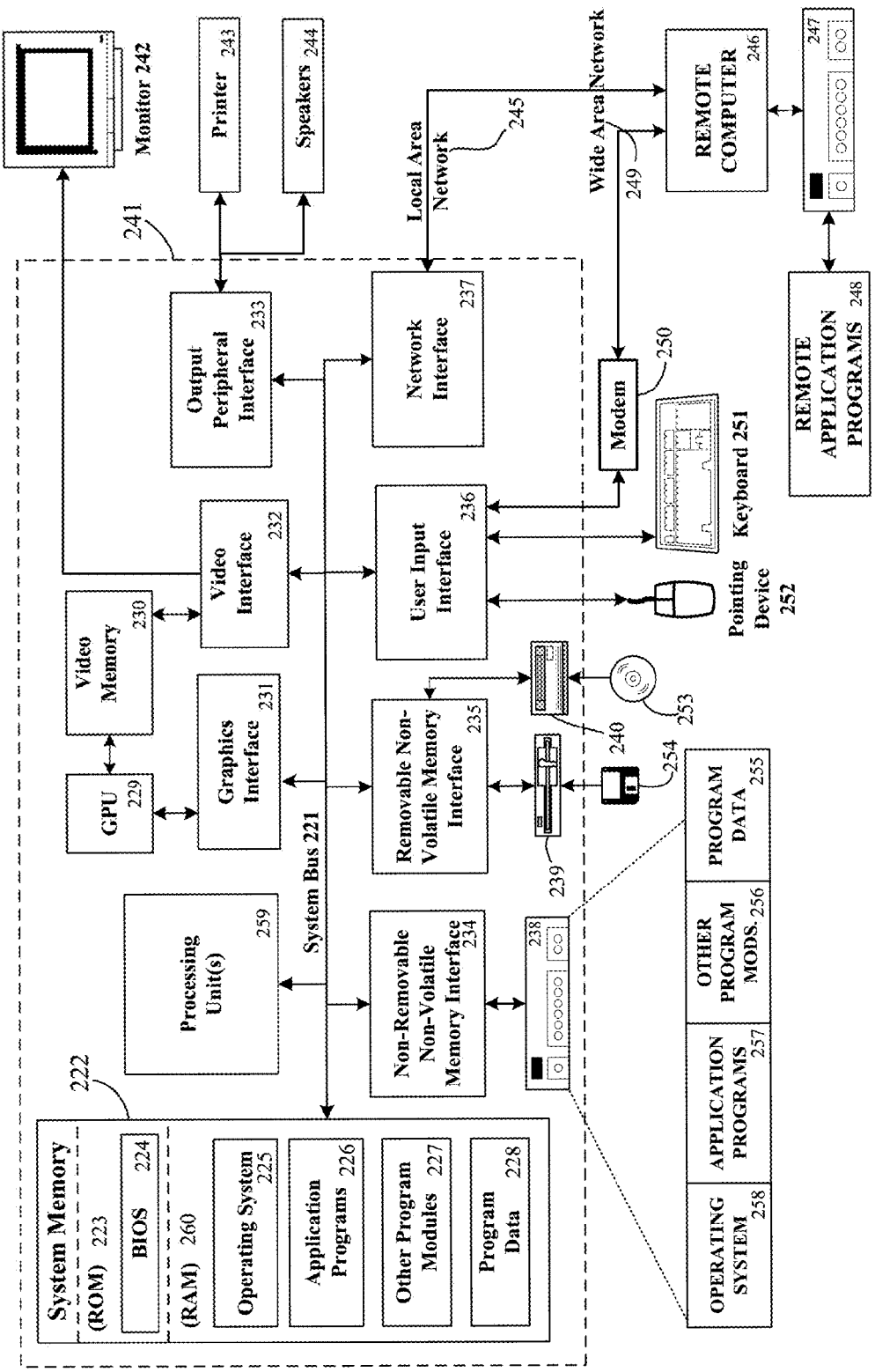
FIG. 4 illustrates another example embodiment of a computing system that may be used to track motion and update an application based on the tracked motion.

FIG. 4 illustrates another example embodiment of a computing system 220 that may be used to implement the computing system 12 shown in FIGS. 1A-2 used to track motion and/or animate (or otherwise update) an avatar or other on-screen object displayed by an application. The computing system 220 is only one example of a suitable computing system and is not intended to suggest any limitation as to the scope of use or functionality of the presently disclosed subject matter. Neither should the computing system 220 be interpreted as having any dependency or requirement relating to any one or combination of components illustrated in the exemplary operating system 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100 that connect via user input interface 236. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233. Capture Device 20 may connect to computing system 220 via output peripheral interface 233, network interface 237, or other interface.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although a memory storage device 247 has been illustrated in FIG. 4. The logical connections depicted include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates application programs 248 as residing on memory device 247. It will be appreciated that the network connections shown are exemplary and other means of establishing a communications link between the computers may be used.

As explained above, capture device 20 provides RGB images (or visual images in other formats or color spaces) and depth images to computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device.

The system will use the RGB images and depth images to track a player's movements. An example of tracking can be found in U.S. patent application Ser. No. 12/603,437, "Pose Tracking Pipeline," filed on Oct. 21, 2009, incorporated herein by reference in its entirety. In one embodiment of tracking a skeleton using depth image is provided in U.S. patent application Ser. No. 12/603,437, "Pose Tracking Pipeline" filed on Oct. 21, 2009, Craig, et al. (hereinafter referred to as the '437 application), incorporated herein by reference in its entirety. Other methods for tracking can also be used. Once the system determines the motions the player is making, the system will use those detected motions to control a video game or other application. For example, a player's motions can be used to control an avatar and/or object in a video game.

While playing a video game or interacting with an application, a person (or user) may leave the field of view of the system. For example, the person may walk out of the room or become occluded. Subsequently, the person may reenter the field of view of the system. For example, the person may walk back into the room or is no longer occluded. When the person enters the field of view of the system, the system will automatically identify that the person was playing the game (or otherwise interacting with the application) and map that person to the player who had been interacting with the game. In this manner, the person can re-take control of that person's avatar or otherwise resume interacting with the game/application.

Figure 5:
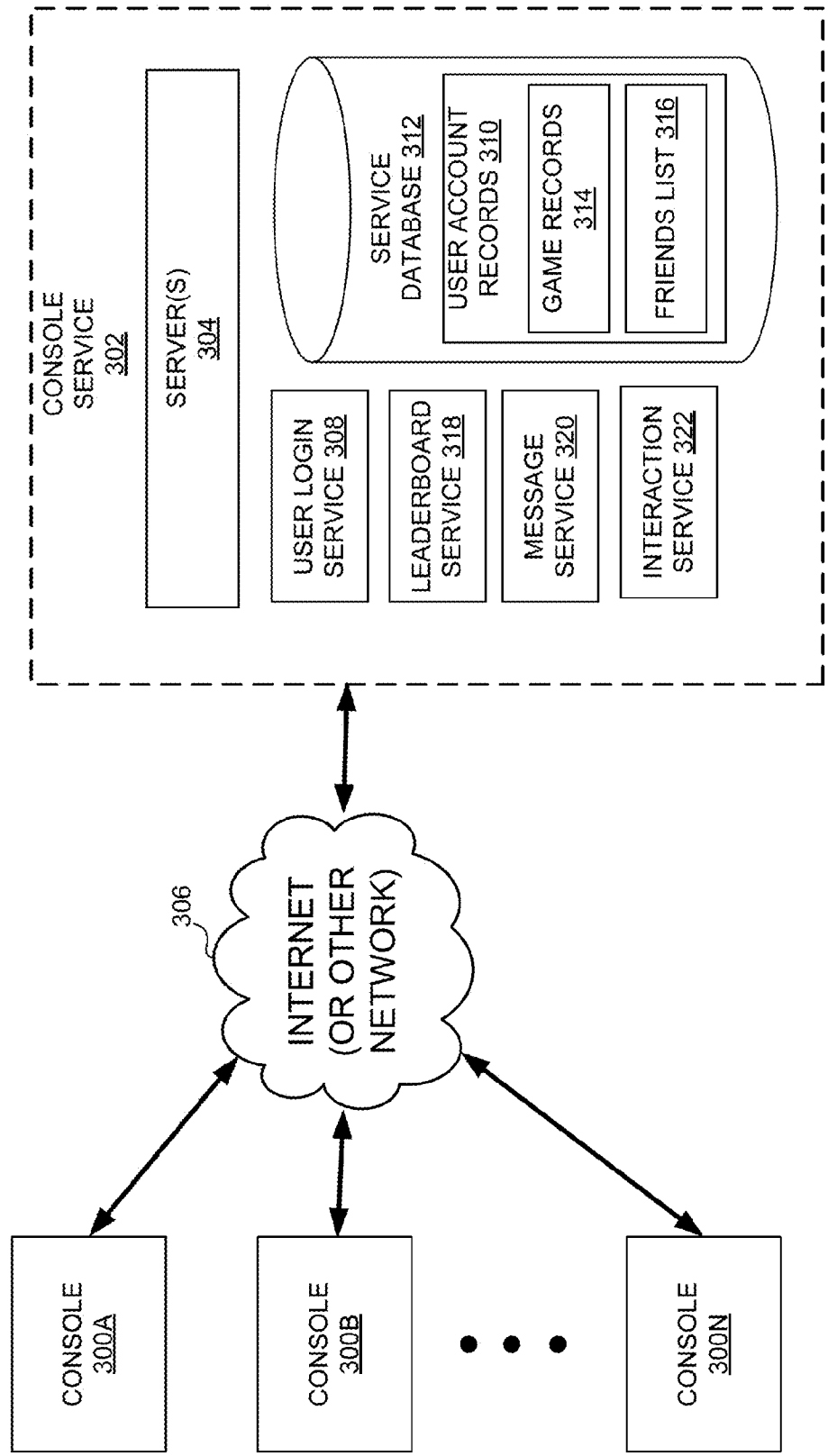
FIG. 5 is a block diagram of an example of an operating environment.

FIG. 5 provides a block diagram of multiple consoles 300A-300N networked with a console service 302 having one or more servers 304 through a network 306. In one embodiment, network 306 comprises the Internet, though other networks such as LAN or WAN are contemplated. Each console 300A-N may be any of a variety of client devices including for example a desktop computer, laptop tablet, smart phone or a variety of other computing devices.

Server(s) 304 include a communication component capable of receiving information from and transmitting information to consoles 300A-N and provide a collection of services that applications running on consoles 300A-N may invoke and utilize. For example, upon launching an application 196 on a console 300A-N, console service 302 may access and serve a variety of content to the console 300A-N via the interaction service 322 (explained below). This content may be stored in a service database 312, or this content may come from a third-party service, in conjunction with the interaction service 322.

Consoles 300A-N may also invoke user login service 308, which is used to authenticate a user on consoles 300A-N. During login, login service 308 obtains a gamer tag (a unique identifier associated with the user) and a password from the user as well as a console identifier that uniquely identifies the console that the user is using and a network path to the console. The gamer tag and password are authenticated by comparing them to user records 310 in a database 312, which may be located on the same server as user login service 308 or may be distributed on a different server or a collection of different servers. Once authenticated, user login service 308 stores the console identifier and the network path in user records 310 so that messages and information may be sent to the console.

User records 310 can include additional information about the user such as game records 314 and friends list 316. Game records 314 include information for a user identified by a gamer tag and can include statistics for a particular game, achievements acquired for a particular game and/or other game specific information as desired.

Friends list 316 includes an indication of friends of a user that are also connected to or otherwise have user account records with console service 302. The term "friend" as used herein can broadly refer to a relationship between a user and another gamer, where the user has requested that the other gamer consent to be added to the user's friends list, and the other gamer has accepted. This may be referred to as a two-way acceptance. A two-way friend acceptance may also be created where another gamer requests the user be added to the other gamer's friends list and the user accepts. At this point, the other gamer may also be added to the user's friends list. While friends will typically result from a two-way acceptance, it is conceivable that another gamer be added to a user's friends list, and be considered a "friend," where the user has designated another gamer as a friend regardless of whether the other gamer accepts. It is also conceivable that another gamer will be added to a user's friends list, and be considered a "friend," where the other user has requested to be added to the user's friends list, or where the user has requested to be added to the other gamer's friends list, regardless of whether the user or other gamer accepts in either case.

Friends list 316 can be used to create a sense of community of users of console service 302. Users can select other users to be added to their friends list 316 and view information about their friends such as game performance, current online status, friends list, etc.

User records 310 also include additional information about the user including games that have been downloaded by the user and licensing packages that have been issued for those downloaded games, including the permissions associated with each licensing package. Portions of user records 310 can be stored on an individual console, in database 312 or on both. If an individual console retains game records 314 and/or friends list 316, this information can be provided to console service 302 through network 306. Additionally, the console has the ability to display information associated with game records 314 and/or friends list 316 without having a connection to console service 302.

Server(s) 304 also include a mail message service 320 which permits one console, such as console 300A, to send a message to another console, such as console 300B. The message service 320 is known, the ability to compose and send messages from a console of a user is known, and the ability to receive and open messages at a console of a recipient is known. Mail messages can include emails, text messages, voice messages, attachments and specialized in-text messages known as invites, in which a user playing the game on one console invites a user on another console to play in the same game while using network 306 to pass gaming data between the two consoles so that the two users are playing from the same session of the game. Friends list 316 can also be used in conjunction with message service 320.

Interaction service 322, in communication with multiple consoles (e.g., 300A, 300B, . . . , 300N) via the Internet or other network(s), provides the interactive service discussed herein in cooperation with the respective local consoles. In some embodiments, interaction service 322 is a video or still content providing service that provides live video of sporting events (or other types of events), replays (or other pre-stored video), and/or statistics about an event (or other data about the event).

Enabling User Interactions with Video Segments

A video segment, as the term is used herein, refers to a plurality of frames that that collectively provide a moving visual image, and typically also provide corresponding audio. As noted above, when a user views a video segment, such as a live action video segment downloaded from a remote data store via the Internet, the viewing of the video segment is typically a completely passive experience for the user. More specifically, there is typically no opportunity for a user viewing a video segment to interact with the video segment. Embodiments of the present technology, which are described below, enable user interaction with a video segment. Accordingly, such embodiments provide for an enhanced user experience, which is beneficial to the user, and is also beneficial to the provider (e.g., producer and/or distributor) of the video segment where their goal is to increase user interest in their video segment. Additionally, the embodiments described below also enable third parties, which do not produce video segments, to provide additional content and user interaction not provided by the producers of the video segments.

As mentioned above, certain embodiments of the present technology relate to methods and systems that enable user interaction with a video segment. More specifically, certain embodiments of the present technology provide the ability to manually identify and store stationary or moving object locations found in a video segment to enable a game construct where a user can search for and discover objects (referred to as hidden objects) at a later time upon video playback. The video segment can be a streaming, looping, or pre-recorded video, but is not limited thereto, as will be described in additional detail below.

Hidden objects, as the term is used herein, refers to objects that are included in a video segment and have been indicated to be objects that a user watching the video segment is instructed to identify. For example, a user may be shown a list of hidden objects, also referred to as a hidden objects list, that include names or icons corresponding to the hidden objects within a video segment. Hidden objects, as the term is used herein, are objects within a video segment that are not completely obscured from being viewed by a user viewing the video segment. Hidden objects may be partially obscured. However, for at least a portion of a video segment each of the hidden objects is at least partially viewable to a user viewing the video segment that includes the hidden objects. In other words, where a video segment is made up of a plurality of frames, each of the hidden objects is viewable in at least one of the frames, and preferably in a plurality of the frames, and potentially in all of the frames, of the video segment.

There are hidden object games that previously existed. However, previous hidden object games have typically been video games in which the pictorial background and the hidden objects are graphically rendered in real time during the playing of the video game. Additionally, previous hidden object games did not involve finding hidden objects within live action video segments. Further, previously hidden object games were typically stored in a single executable game file produced by a single producer, e.g., a single game development company.

Figure 6:
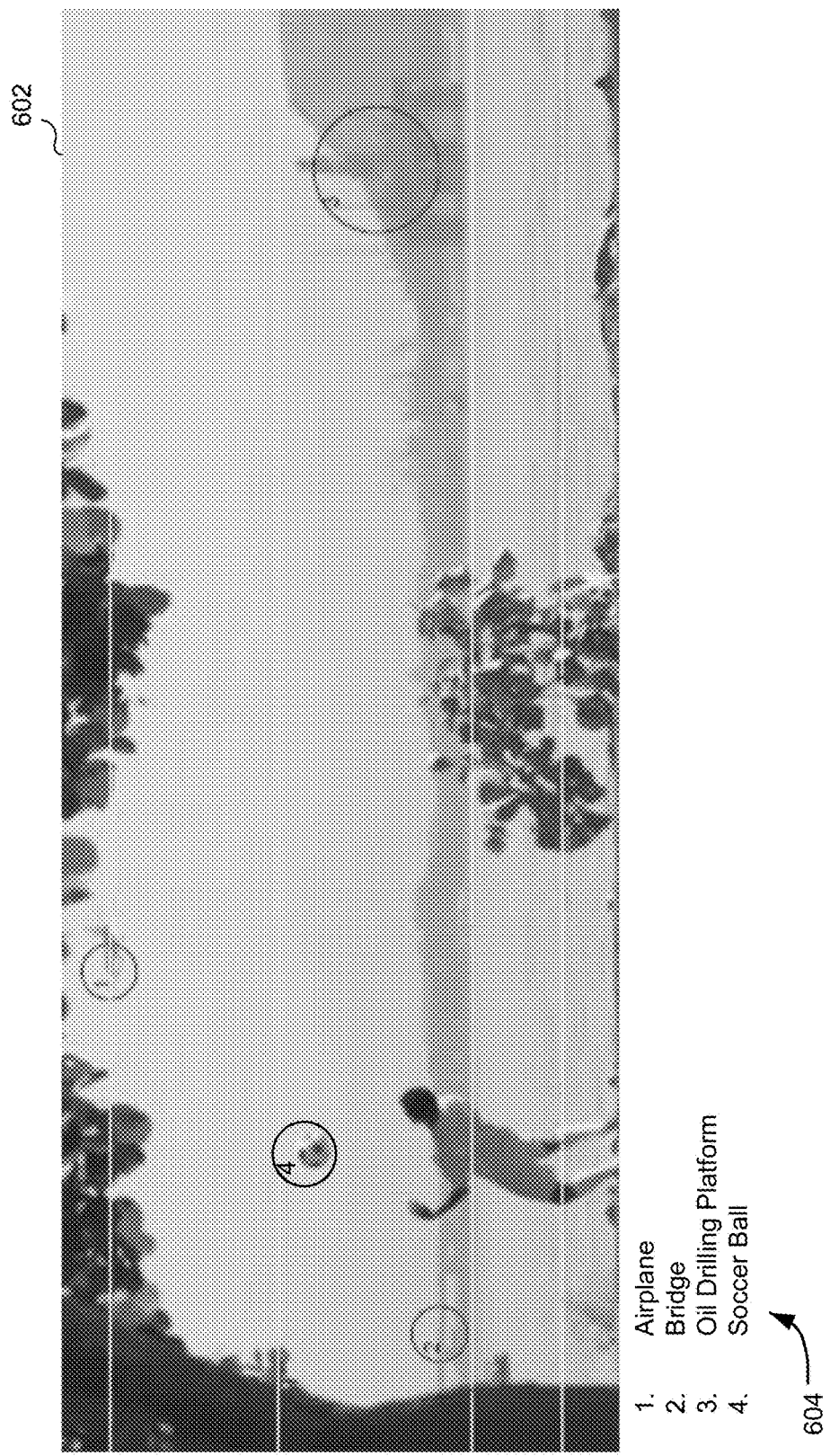
FIG. 6 illustrate an exemplary frame of a video segment in which hidden objects are present and interactable and a list of hidden objects is displayed.

FIG. 6 illustrates an exemplary frame 602 of a live action video segment (e.g., a looping video) in which hidden objects are present and interactable, in accordance with an embodiment of the present technology. More specifically, the FIG. 6 example illustrates a list 604 of four hidden objects whose spatial locations in the video segment have been stored as a collection in a hit-zone file, discussed in more detail below, as the basis for an interactive game. In accordance with specific embodiments, the time to complete the game successfully and the accuracy of each selection is tracked and results in a score which then can be ranked on a leaderboard.

Still referring to FIG. 6, the list 604 is an example of a textual list of hidden objects that includes the following text: 1. Airplane, 2 Bridge, 3 Oil Drilling Platform, and 4 Soccer Ball. In an alternative embodiment, the list 604 can instead be a pictorial list, e.g., including icons or other pictorial representations of the hidden objects that are to be found by the user. In a further embodiment, the list 604 is a combination of a textual and pictorial items, i.e., one or more hidden objects is/are listed textually, and one or more hidden objects is/are listed pictorially. Still referring to FIG. 6, the circles that are labeled 1, 2, 3 and 4 have been included to generally show the locations of the hidden objects in the video frame, but such circles would not be viewable to a user that is attempting to identify the hidden objects. In accordance with an embodiment, the circles are viewable at the end of playing a hidden objects game to show a user where the hidden objects are located, e.g., if the user missed identifying certain hidden objects. In accordance with an alternative embodiment, the circles are not viewable at the end of playing a hidden objects game, so that the player can replay the same hidden objects game without spoilers.

In accordance with an embodiment, one or more of the hidden objects is/are static, while one or more further hidden objects is/are moving. For example, in FIG. 6 the oil drilling platform may be static and the airplane may be moving. In an embodiment, even though a particular hidden object may be static relative to its surroundings, the hidden object may nevertheless move in the video segment, e.g., because the camera used to capture the video segment pans in one or more directions and/or because the camera used to capture the video segment zooms in or out. For example, if the camera used to capture frames of a video segment, including the frame shown in FIG. 6, panned from left to right, the oil drilling platform (shown by the circle labeled 3) would appear to move to the right.

Figure 7:
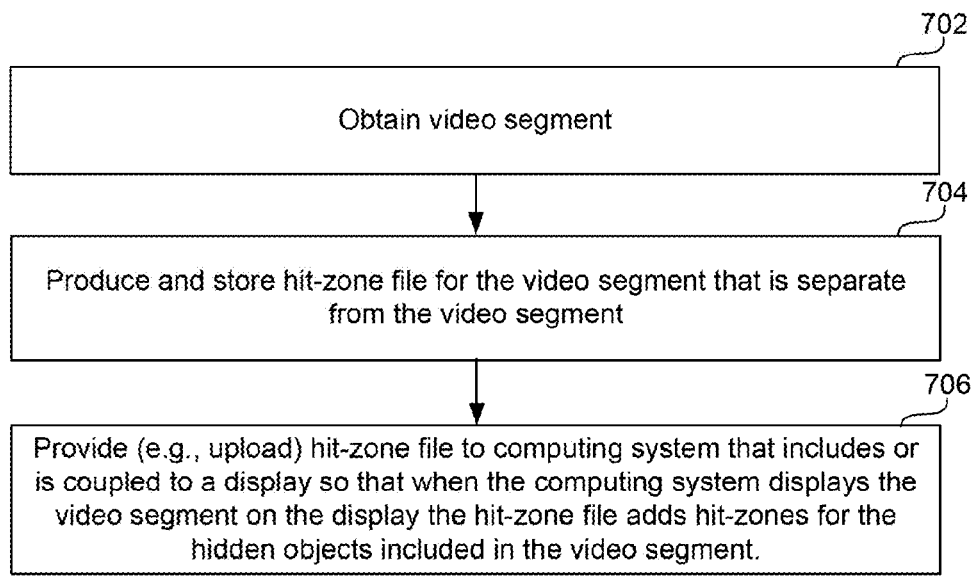
FIG. 7 is a high level flow diagram that is used to summarize a method according to an embodiment.

The high level flow diagram of FIG. 7 will now be used to summarize a method, according to an embodiment of the present technology, for enabling user interaction with a video segment. Referring to FIG. 7, at step 702, a video segment, that is displayable on a display included in or coupled to a computing system, is obtained. Such a video segment can be, e.g., downloaded over the Internet, or obtained from a local or remote data storage device. The video segment includes a plurality of video frames. In an embodiment, the video segment is a live action video segment. In another embodiment, the video segment is an animated video segment. The video segment can alternatively include a combination of live action and animation. In still another embodiment, the video segment can include pre-rendered computer-generated imagery (CGI), or a combination of pre-rendered CGI, live action and/or animation.

At step 704, a hit-zone file is produced and stored, separately from the obtained video segment. The hit-zone file includes hit-zone data corresponding to spatial regions that define hit-zones for hidden objects included in the video segment. In an embodiment, each of the hit-zones is defined by a different portion of the hit-zone data and corresponds to a different one of the hidden objects included in the video segment. For example, referring back to FIG. 6, a hit-zone file can include hit-zone data that corresponds to the airplane shown therein, hit-zone data corresponding to the bridge shown therein, hit-zone data corresponding to the oil drilling platform shown therein, and hit-zone data corresponding to the soccer ball shown therein. The spatial regions that define the hit-zones for hidden objects are not visible to a user that uses a computing system to view the video segment with the hit-zones added. Nevertheless, the spatial regions that define the hit-zones for hidden objects may be visible to a person (e.g., a game developer) in the process of producing the hit-zone file, e.g., using a video compositing application, such as, but not limited to, Adobe After Effects™ developed by Adobe Systems Incorporated, which is headquartered in San Jose, Calif. Additional details of step 704, according to specific embodiments, are discussed below with reference to FIG. 8.

Still referring to FIG. 7, at step 706 the hit-zone file is provided (e.g., uploaded) to a computing system that includes or is coupled to a display so that when the computing system displays the video segment on the display the hit-zone file adds hit-zones for the hidden objects included in the video segment. Exemplary computing systems to which the hit-zone file may be provided include the computing system 12 described above with reference to FIGS. 1A, 1B and 2, the multimedia console 100 described above with reference to FIG. 3, and the computing system 220 described above with reference to FIG. 4, but are not limited thereto. Such computing systems may utilize a network interface (e.g., 124 in FIG. 3, or 237 in FIG. 4) to receive the hit-zone file from an external computer or an external data storage device.

In an embodiment, the hit-zone file associated with a specific video segment can be provided to a computing system whenever a computing system downloads the specific video segment. In another embodiment, when a computing system is used to request a specific video segment, the user of the computing system is asked whether they would like to play a hidden objects game associated with the video segment (or more generally, whether they would like to interact with the video segment), and if the user responds in the affirmative the hit-zone file is provided (e.g., uploaded) to the computing system. In still another embodiment, a user can use their computing system to specify that they want to play a hidden objects game, in response to which the computing system initiates the downloading of a video segment and also initiates the downloading of a separate hit-zone file associated with the video segment. It is also possible that the video segment and associated hit-zone file are both stored locally on a user's computing system. Regardless of how a computing system obtains a video segment and a separate associated hit-zone file produced for the video segment, the computing system can be used to play the video segment while the computing system simultaneously uses data included in the hit-zone file to add hit-zones to the video segment being played.

Figure 8:
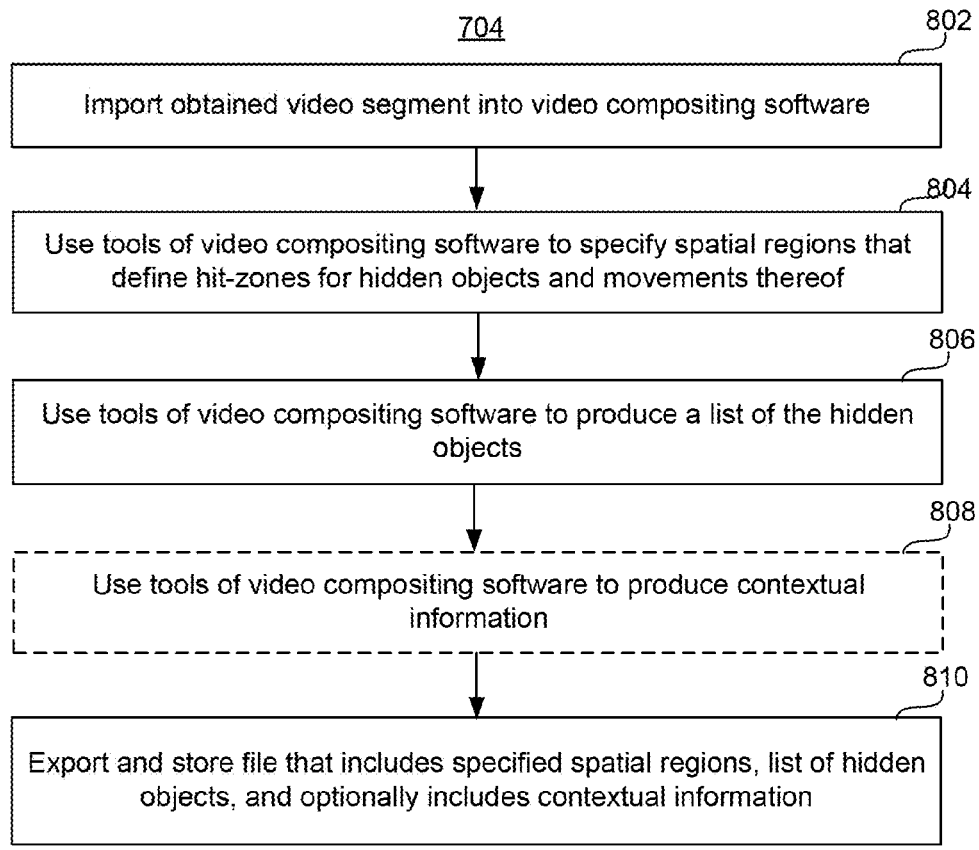
FIG. 8 is a high level flow diagram that is used to explain additional details of one of the steps introduced in FIG. 7.

Additional details of step 704, according to specific embodiments, will now be described with reference to FIG. 8. Referring to FIG. 8, at step 802 the video segment (obtained at step 702 in FIG. 7) is imported into a video compositing application or some other software application that is capable of adding special effects to a video segment. As mentioned above, Adobe After Effects™ developed by Adobe Systems Incorporated, is an example of such a software application. Other types of software that enable special effects to be added to a video segment can alternatively be used.

At step 804, one or more tools of the video compositing application (or another software application into which the video segment is imported) is/are used to specify spatial regions that define hit-zones for hidden objects. In an embodiment, a mouse, cursor, stylus and/or some other user interface is used to trace the perimeter of each hidden object in a frame of the video segment, and hit-zone data indicative of each traced perimeter is stored. In accordance with an embodiment, at least one of the spatial regions that defines a hit-zone for one of the hidden objects, changes in shape, size and position over a span of the video segment. In accordance with an embodiment, the compositing application or other software that is used to produce the hit-zone file automatically changes the shape, the size and the position the spatial region(s) that defines the hit-zone(s) for the hidden object(s) that change in shape, size and position over the span of the video segment. Alternatively, the person(s) that produce the hit-zone file can manually changes the shape, size and position of the spatial region(s) that defines the hit-zone(s) for the hidden object(s). For example, where a hidden object changes in shape, size and/or position over the span of the video segment, the procedure of tracing the perimeters of hidden objects can be repeated for each frame of the video segment, or alternatively, a video compositing application, or a similar software application, can be used to automatically track the movement of each hidden object over the span of the video segment.

At step 806, one or more tools of the video compositing application (or another software application into which the video segment is imported) is/are used to produce a list of the hidden objects. For example, tools the enable textual elements to be added to a video segment can be used at step 804. Additionally, or alternatively, tools that enable pictorial elements to be added to a video segment can be used at step 804, where at least a portion of the list of hidden objects is pictorial. Pictorial icons can, for example, be selected from open or proprietary clip art libraries. It is also possible that an image of the actual hidden object be included in the list of hidden objects. As will be described in additional detail below, thereafter (when a computing system that has downloaded both the video segment and the hit-zone file displays the video segment on a display) the list of hidden objects will be viewable to a user of a computing system that views the video segment with the hit-zones added. Referring briefly back to FIG. 6, the list 604 is an example of a list of hidden objects. The list of hidden objects can alternatively be generated manually, i.e., without using tools of the video compositing application or another software application into which the video segment is imported.

In accordance with certain embodiments, the producing and storing of a hit-zone file (at step 704) also includes producing and storing contextual information for one or more of the hidden objects such that the hit-zone file includes data corresponding to the contextual information. In such embodiments, when a computing system displays the video segment on a display the contextual information about one of the hidden objects is displayed in response to a user correctly identifying one of the hidden objects for which contextual data is stored in the hit-zone file. More specifically, referring to FIG. 8, at optional step 808 (shown in a dashed box), one or more tools of the video compositing application (or another software application into which the video segment is imported) is/are used to add contextual information. The contextual information can be textual and/or pictorial. For example, referring back to FIG. 6, separate contextual information can be produced for one or more of the hidden objects shown therein. For a more specific example, contextual information corresponding to the airplane may include information about the history of airplanes and/or the type of airplane shown. For another example, contextual information corresponding to the soccer ball may include information about the history and/or popularity of the game of soccer and/or information about the size and weight of a regulation soccer ball used in the World Cup. For still another example, contextual information may include links to further information related to the hidden objects. These are just a few examples, which are not intended to be all encompassing. One or ordinary skill in the art would appreciate that the type of contextual information that is appropriate may depend on the underlying content of the video segment and the hidden objects for which the hit-zone file is being produced.

At step 810, a hit-zone file is exported and stored, wherein the hit-zone file includes data that specifies spatial regions of hidden objects, data that specifies a list of the hidden objects, and optionally also includes data that specifies contextual information for one or more of the hidden objects. In accordance with an embodiment, the hit-zone file is an Extensible Markup Language (XML) file. In another embodiment, the hit-zone file is a JavaScript Object Notation (JSON) file. In still another embodiment, the hit-zone file is a binary file. Other file formats for the hit-zone file are also possible and within the scope of embodiments of the present technology. As will be appreciated from the discussion of FIG. 9 below, programmed logic (e.g., programmed game logic) can also be added to the hit-zone file, wherein the program logic includes computer executable instructions that define the gameplay and rules for a hidden objects game. Alternatively, the programmed logic can be included in a separate file, e.g., in a separate executable file.

Figure 9:
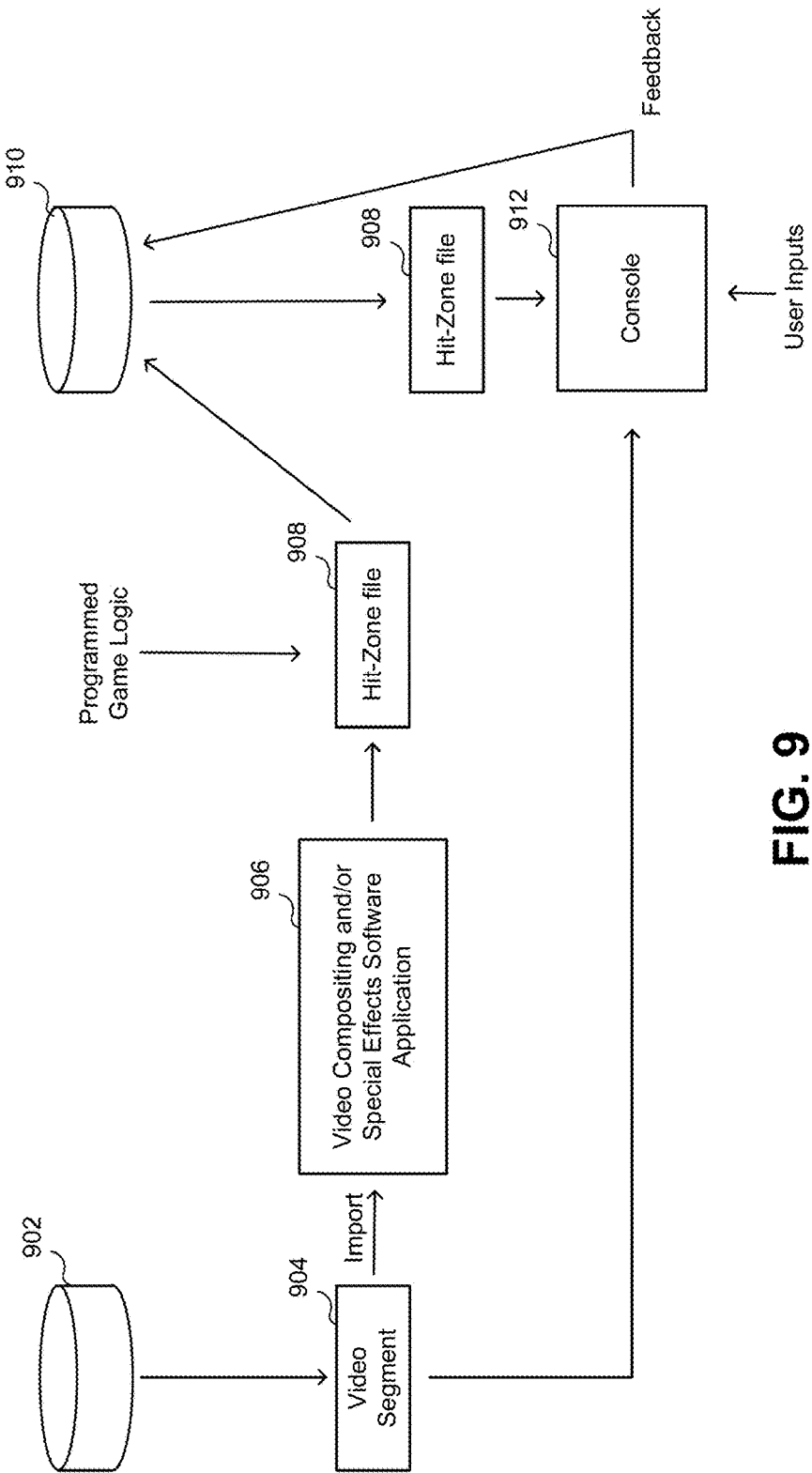
FIG. 9 is a high level process flow diagram that is used to summarize various embodiments described herein.

FIG. 9 is a high level process flow diagram that is used to summarize various embodiments described herein. Referring to FIG. 9, a video segment 904 is shown as being downloaded from a data store 902 and imported into video compositing and/or special effects software application 906, such as, but not limited to, Adobe After Effects™. As was explained above with reference to FIGS. 7 and 8, the video compositing and/or special effects software application 906 is used to produce and store a hit-zone file 908 that includes hit-zone data corresponding to spatial regions that define hit-zones for hidden objects included in the video segment 904. FIG. 9 also shows the programmed logic (e.g., programmed game logic) can be included in the hit-zone file, wherein the programmed logic includes computer executable instructions that define the gameplay and rules for a hidden objects game. The hit-zone file 908 that includes the hit-zone data and the programmed logic is stored in a data store 910, where it is available for downloading by a console 912. Alternatively, the programmed logic can be included in a separate file, e.g., in a separate executable file, and stored in the data store 912, which can be a cloud-based server, but is not limited thereto, or in some other data store 912. The console 912 can be almost any computing system, including, but not limited to, the computing systems described above with reference to FIGS. 1A-5. For additional examples, the console 912 can be a smartphone, a tablet computing device, a laptop computing device, a desktop computing device, or the like.

In certain embodiments, the video compositing and/or special effects software application 906, which can more generically be referred to as a video editor, can use provided scripts to export animated snippets. Hit-zone coordinates and animated snippets can be included in the hit-zone file 908. The video editor can also be used to perform hit-zone markups and animation.

Still referring to FIG. 9, the console 912 is shown as downloading the video segment 904 from the data store 902, and downloading the hit-zone file 908 from the data store 910. It is also possible that the video segment 904 and the hit-zone file 908 are stored in a common data store, albeit as separate files. In FIG. 9 the console 912 is shown as downloading the video segment 912 from the same data store 902 from which the video segment 904 was obtained for importation into the video compositing and/or special effects software application 906, however that need not be the case. It is also possible that the video segment 904 imported into the video compositing and/or special effects software application 906 is a raw non-compressed video segment, and the video segment downloaded by the console 902 is a compressed video segment, or vice versa. The console 912 is used to play and display the video segment (on a display included in or coupled to the console 912) and utilizes the hit-zone file to add hit-zones for the hidden objects included in the video segment. The console 912 also uses the programmed logic to implement gameplay. Such gameplay can include, e.g., manipulation rules that define what a player can do in a hidden objects game, goal rules that define the goal of the hidden objects game, and meta-rules that define how a hidden objects game can be tuned or modified, but are not limited thereto.

Still referring to FIG. 9, the console 912 includes a user interface that accepts user inputs that indicate where the user thinks the hidden objects are located. The user interface can be, e.g., a pointing device (e.g., a mouse, touchpad, or the like), a keyboard, a game controller, or a natural user interface (NUI), but is not limited thereto. The console 912 can provide feedback to the user during playing of a hidden objects game. Additionally, during and/or after a hidden objects game is completed, the console 912 can provide feedback to the data store 910, or some other data store, that maintains a leaderboard with the fastest and most accurate game completions for a given set of objects and video segment.

An accuracy score can be indicative of how many hidden objects, of the total number of hidden objects, were found within an allotted time period. An accuracy score can additionally take into account whether a user incorrectly selected where they thought one or more of the hidden objects were located. In a specific embodiment, an accuracy score can take into account whether user selections were within the actual boundaries of the hidden object, as opposed to within an acceptable tolerance of an actual boundary. In one embodiment, the center of each hidden object is determined, and the closer a user selection is to the center of a hidden object the higher the accuracy score provided when the user correctly identifies the hidden object. Other variations are possible, and within the scope of an embodiment.

In certain embodiment, the data stores 902 and/or 910 can be implemented by one or more cloud-based servers, but are not limited thereto.

Figure 10:
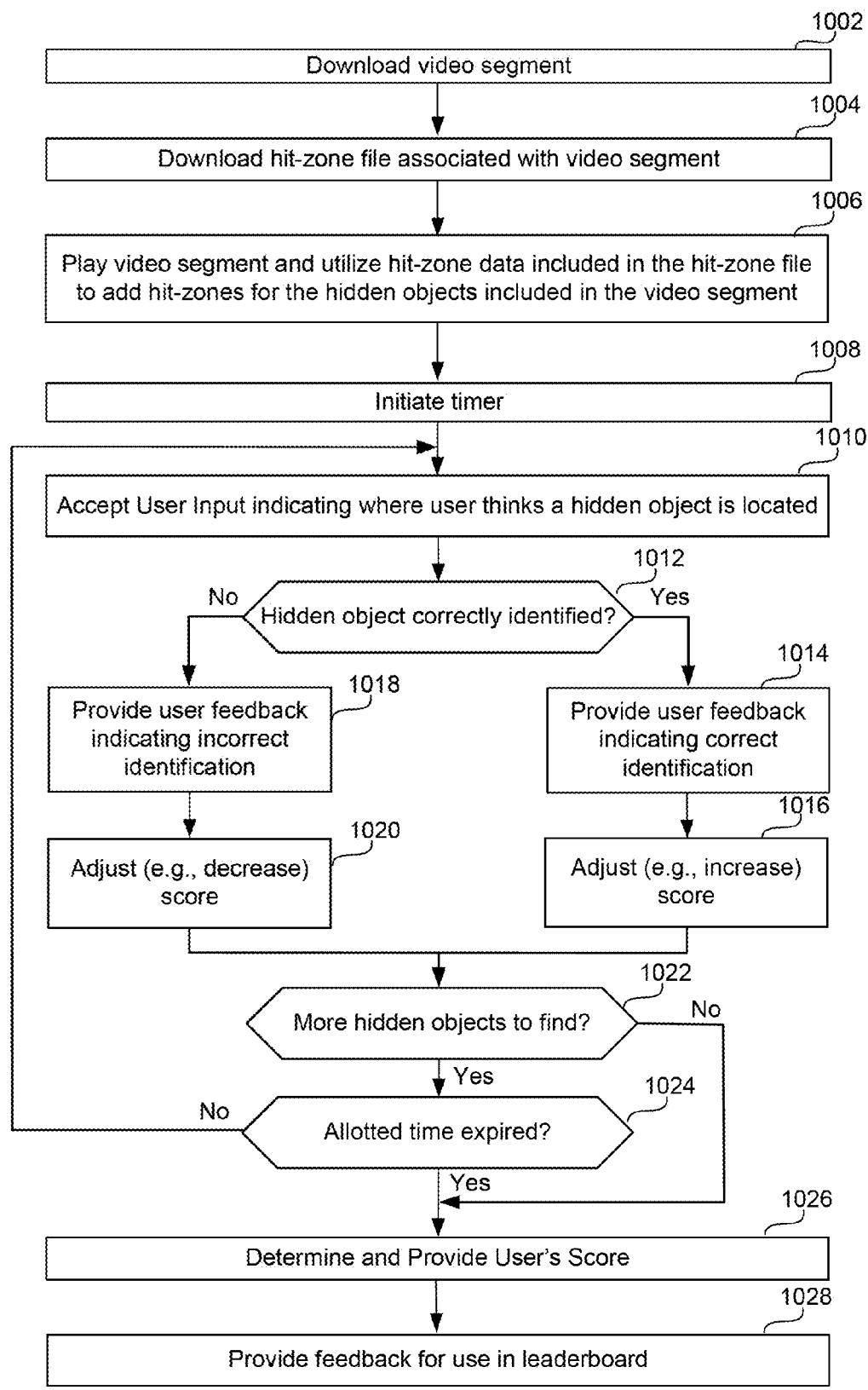
FIG. 10 is a high level flow that is used to summarize how a hit-zone file can be used to enable user interaction with a video segment in accordance with certain embodiments.

FIG. 10 will now be used to summarize the steps performed by a computing system (e.g., a console) that enables a user to interact with a video segment in accordance with certain embodiments of the present technology. Referring to FIG. 10, at step 1002 a video segment is downloaded. At step 1004 a hit-zone file associated with the video segment is downloaded, wherein the hit-zone file is separate from the video segment. Steps 1002 and 1004 can alternatively be reversed in order, or performed simultaneously. At step 1006 the video segment is played and hit-zone data of the hit-zone file is used to add hit-zones for hidden objects included in the video segment. The hit-zone file, as explained above, can also cause a list of hidden objects to be displayed. At step 1008 a timer is initiated, which is used to keep track of how long the user takes to identify all of the hidden object and/or is used to determine whether an allotted amount of time for finding the hidden objects has expired.

At step 1010 a user input is accepted that indicates where a user thinks a hidden object is located. Step 1010 can be performed using a user interface, such as, but not limited to, a pointing device (e.g., a mouse, touchpad, or the like), a keyboard, a game controller, or a natural user interface (NUI). A user may indicate where they think a hidden object is located by positioning a cursor, arrow or other indicator over an object and pressing a predetermined button or performing a predetermined gesture that indicates that the user is making a selection.

At step 1012 there is a determination of whether the user correctly identified a hidden object. If the position where the user thinks the object is located is within a spatial region defined by a hit-zone, then the user correctly identified a hidden object. In another embodiment, so long as the indicated location where the user thinks the object is located is within a specified tolerance of a spatial region defined by a hit-zone, then the user correctly identified a hidden object, albeit potentially will less accuracy. At step 1014 feedback is provided to the user indicating that they correctly identified a hidden object, and a score is adjusted at step 1016. Step 1014, or an additional step, may provide contextual information to the user about the correctly identified hidden object. Examples of such contextual information were discussed above. If the position where the user thinks the object is located is not within a spatial region defined by a hit-zone (or not within a specified tolerance of the spatial region), then there is a determination that the user did not correctly identify a hidden object. At step 1016 feedback is provided to the user indicating that they did not correctly identify a hidden object, and a score is adjusted at step 1018.

At step 1022 there is a determination of whether there are any more hidden objects to find 1022. If there is/are additional hidden object(s) to be found, then there is a determination at step 1024 of whether an allotted amount of time has expired. If the allotted amount of time has not expired, then flow returns to step 1010 so that an additional user input can be accepted. Alternatively, there can be no time limit, and if there is/are additional hidden object(s) to be found, flow can return to step 1010 so that an additional user input can be accepted. In an embodiment where there is no time limit for finding all of the hidden objects, the video segment may play in a loop until all of the hidden objects are correctly identified, or until a user indicates that they would like to exit the viewing of the video segment/playing the hidden objects game. In another variation, the allotted amount of time can simply be the amount of time required to finish playing the video segment once through, or some other integer number of times. Other variations are also possible and within the scope of an embodiment.

At step 1026 a user's score is determined (e.g., calculated) based on how many hidden objects they correctly identified, how long it took the user to correctly identify the hidden objects and/or based on the user's accuracy. At step 1026 the score can be displayed or otherwise provide to the user, potentially with a detailed breakdown as to how the score was calculated. At step 1028 information about the user's score can be uploaded to an external data store that maintains leader board information, which a user can download and view if they desire.

The video segment can be produced at a significantly earlier time than the time at which the video segment is downloaded by a computing system for display to a user in a manner that, by utilizing a hit-zone file, enables the user to interact with the video segment. In certain embodiments, the video segment can be downloaded and displayed in real-time or near real-time relative to when the video segment is produced. For example, the video segment can include near real-time sporting event footage or highlights. In such a case, the hit-zone file would need to be created very quickly, e.g., during a time delay associated with the streaming or otherwise distribution of the video segment. In other words, the hit-zone file is produced in real-time or near real-time relative to when the video segment is produced.

In accordance with an embodiment, a plurality of different hit-zone files are produced for the same video segment, wherein one or more of the hidden objects and the hit-zones defined therefor is/are different in the different hit-zone files. In such an embodiment, at least two of the hit-zones files (associated with a same video segment) can be provided to a same computing system (at different times, or at the same time) so that different interactive experiences can be provided to a user of the same computing system that views the video segment at the different times. For example, when a user views a video segment for a first time, a first list of hidden objects can be displayed; and when the user view the video segment at a later time (e.g., the next day), a different list of hidden objects can be displayed to the user, thereby providing for a different interactive user experience.

In accordance with certain embodiments, the spatial regions that define hit-zones for hidden objects included in the video segment are defined by an individual or small group of individuals (e.g., game developers). In accordance with alternative embodiments, the specifying of spatial regions that define hit-zones for hidden objects included in the video segment is performed using crowdsourcing. This can be achieved as follows. In additional to uploading a video segment to a plurality of computing systems, instructions that request that users of the computing systems identify a particular hidden object within the video segment can also be uploaded and displayed (and/or audibly provided) to the users along with the video segment. A computing system can receive feedback from the user's, as to where they think specific hidden objects are located, and the computing system can identify an area within the video segment that a highest percentage of the users identified as corresponding to the particular hidden object. For each of the hidden objects that users were instructed to find, a spatial region that defines a hit-zone for the hidden object can be specified based on the identified area within the video segment that the highest percentage of the users identified as corresponding to the particular hidden object. In the crowd-sourcing embodiments, users that initially attempt to identify hidden objects may not receive immediate feedback regarding whether they correctly identified locations of hidden objects, because the locations may not yet be defined. Rather, such users may only get feedback after they completed the task of attempting to identify a list of hidden object, and/or only after a certain amount of other users completed the task.

Certain embodiments described herein provide the ability to store multiple objects on-screen locations in a video sequence that may or may not move over time, which is then used to create a "Hidden Object game" where the user guesses the object locations (from a list provided by the system) and has their responses validated by system using the previously stored object locations. In accordance with certain embodiments, a system times and stores how long the user took to correctly identify a specific list of hidden objects in a video along with the number of attempts and the accuracy of each guess. In accordance with certain embodiments, a system provides a leaderboard with the fastest and most accurate game completions for a given set of objects and video. In accordance with certain embodiments, the user can interact with the system using a mouse, keyboard, controller or NUI gestures, but not limited thereto. In an embodiment, a dynamic object target area, which is manually pre-defined and variable shaped, changes with time depending on a position of an object in a video.

In some embodiments, an object is manually identified initially and a dynamic object area is set to overlap it, wherein the dynamic object is not visible to user.

Exemplary details of a Game Setup Process, according to an embodiment, are listed below.

1. Manually identify objects of interest in video sequence.
2. A hit-zone is applied over each of the desired objects of interest. Such hit-zones can have variable shapes and sizes
2. Hit-zones are applied manually through XML markups and scripting (an example is provided below)
4. A collection of hit-zones defines a list of objects to find in a game instance.

Exemplary details of a Game Execution Process, according to an embodiment, are listed below.

5. The hit-zones are made to move to match any movement of the object. Over time the video plays at a certain speed and when the video loops software accounts for the delay in returning to the beginning of the video without compromising the hit-zones location. In an embodiment, this is done by aligning an animations playback speed to a video timeline.
6. A user can move a cursor using a mouse, a keyboard, a gaming controller, or using gestures captured by a depth camera or other NUI. In certain embodiments, conflicts are resolved when multiple user interface devices are used at the same time. In one embodiment, this can be done by giving an analog input device higher priority.
7. In certain embodiments, cursor movement speed and behavior is modified based on how long the user has pressed or been holding a direction button. For example, a cursor moves faster when a direction has been pressed for a longer period of time. In an embodiment, cursor movement is prevented for a brief duration after the engagement button is pressed. This can include, for example, a left click for a mouse, and enter button on a keyboard (or alternatively, this can be mapped to any key on the keyboard), an "A" button on a video game controller (or alternatively, this can be mapped to any button), or push gesture (or some other gesture to which this is mapped).
8. In certain embodiments, the hit-zones are hooked up to a state-machine that tracks whether or not they have been clicked on.
9. In certain embodiments, feedback is given to the user with a cursor animation if the selection was correct or incorrect. For example, the cursor or some other object may be made green when the selection is correct, and made red when the selection is incorrect.
10. In an embodiment, once all hit-zones in a collection have been clicked on then the game will automatically finish and the time to complete the game is stored along with the accuracy (e.g., distance to center of hit-zone).
11. In an embodiment, the times and accuracies are stored and ranked in a data store which then can be used to provide a Leaderboard for the best game completion score.

Certain embodiments described herein provide an ability to interact with objects that may move during the course of the video segment. For example, hidden objects may or may not move over time in relation to a video segment. In an embodiment, the location of an object in a video segment is automatically tracked, e.g., using automated visual image detection algorithms and a basic definition (based on computer vision) of target objects will be automatically detected and tracked. In an embodiment, there is an ability to identify objects either manually, automatically or through crowd-sourcing. For example, crowd sourced data (user guesses) can be used to cluster/validate correct hidden object positions (and then work back to find first winner). There can also be a scenario where objects are not tracked initially but instead are determined by the resulting interactions of users that are prompted to find said object. For example, users can be instructed to "find red hat in crowd", and the area with the highest percentage of hits becomes the "red hat" regardless of if there actually is one.

Embodiments described herein provide an ability to enhance a user experience when viewing a video segment by adding an element of interactivity. In an embodiment, hidden objects can be included in a live video stream. This can be accomplished, e.g., where a producer watches satellite feed and marks an object to be found (with position and timestamp in video). Further, interactivity and overlays can be enabled on tagged/tracked objects. For example, there can be linking of an in content target that has been previously identified by a producer to a form of interactivity or overlays—this could be a tracked player in a live stream that when a user's intent is understood would provide further information or methods of interaction.

Certain embodiments described herein are directed to methods for enabling user interaction with a video segment. In accordance with an embodiment, such a method involves obtaining a video segment that is displayable on a display included in or coupled to a computing system. The method also involves producing and storing a hit-zone file that includes hit-zone data corresponding to spatial regions that define hit-zones for hidden objects included in the video segment. The hit-zone file is provided (e.g., uploaded) to a computing system that includes or is coupled to a display so that when the computing system displays the video segment on the display the hit-zone file adds hit-zones for the hidden objects included in the video segment. In accordance with embodiments, the hit-zone file is produced separately from the video segment. Each of the hit-zones is defined by a different portion of the hit-zone data and corresponds to a different one of the hidden objects included in the video segment. The spatial regions that define the hit-zones for hidden objects are not visible to a user of the computing system that views the video segment with the hit-zones added. In an embodiment, at least one of the spatial regions, that defines one of the hit-zones, changes in shape, size and position over a span of the video segment. In such an embodiment, the method can include automatically changing a shape, a size and a position of one of the spatial regions that defines a hit-zone that changes in shape, size and position over the span of the video segment.

In an embodiment, the hit-zone file is stored within a different data store than the video segment, and the hit-zone file is uploaded to a computing system separately from the video segment being uploaded to the computing system.

In accordance with an embodiment, the producing and storing of a hit-zone file also includes producing and storing a list of the hidden objects such that the hit-zone file includes data corresponding to the list of the hidden objects so that when a computing system displays the video segment on a display the list of hidden objects is viewable to the user of the computing system that views the video segment with the hit-zones added.

In accordance with an embodiment, the producing and storing of a hit-zone file also includes producing and storing contextual information for one or more of the hidden objects such that the hit-zone file includes data corresponding to the contextual information so that when a computing system displays the video segment on a display, the computing system also displays contextual information about one or more of the hidden objects in response to a user correctly identifying one of the hidden objects for which the contextual data is stored in the hit-zone file.

In certain embodiments, the video segment can be produced and stored prior to the producing and storing of the hit-zone file. In other embodiments, the hit-zone file can be produced in real-time or near real-time relative to when the video segment is produced. Either way, a producer of the hit-zone file differs from a producer of the video segment.

A plurality of different said hit-zone files can be produced for the same video segment, wherein one or more of the hidden objects and the hit-zones defined therefor is/are different in the different hit-zone files. This way, if at least two of the hit-zones files is provided to a same computing system, different interactive experiences can be provided to a user of the same computing system that views the video segment at the different times.

In accordance with certain embodiments, the spatial regions that define hit-zones for hidden objects included in the video segment are identified using crowdsourcing. Where crowdsourcing is used to produce and store a hit-zone file, instructions can be provided to a plurality of computing systems, wherein the instructions request that users of the computing systems identify a particular hidden object within the video segment that is being displayed to the users. An area within the video segment that a highest percentage of the users identified as corresponding to the particular hidden object can then be used to produce a spatial region that defines a hit-zone for the particular hidden object. In other words, a spatial region that defines a hit-zone for a particular hidden object can be determined based on the identified area within the video segment that the highest percentage of the users identified as corresponding to the particular hidden object.

In accordance with certain embodiments, during displaying of a video segment on a display of the computing system, with hit-zones added in accordance with the hit-zone file produced for the video segment, user inputs are accepted that indicate where a user thinks the hidden objects are located. User feedback is provide to the user, which informs the user whether or not they correctly indicated where the hidden objects are located. Additionally, timing and/or accuracy of the inputs from the user are tracked and feedback indicative thereof can be provided to a user and/or used to generate a leaderboard.

Certain embodiments of the present technology are directed to a system that enables user interaction with a video segment. Such a system can include a display interface that interfaces with a display capable of displaying video content. The system can also include a network interface that receives a video segment that is displayable on a display included in or coupled to the system, and that separately receives a hit-zone file that includes hit-zone data corresponding to spatial regions that define hit-zones for hidden objects included in the video segment. Additionally, the system includes one or more processors in communication with the network interface and the display interface. The one or more processors is/are used to play the video segment so that the video segment is displayable on the display included in or coupled to the system, and utilize the hit-zone data included in the hit-zone file to add hit-zones for the hidden objects included in the video segment. Additionally, the system also includes a user interface that accepts user inputs that indicate where the user thinks the hidden objects are located. The one or more processors is/are also in communication with the user interface and thereby receive data from the user interface indicative of where the user indicated they think the hidden objects are located. Additionally, the one or more processors provide user feedback that informs the user whether or not they correctly indicated where the hidden objects are located, and track timing and/or accuracy of the inputs received from the user. In an embodiment, the hit-zone file also includes data corresponding to a list of the hidden objects so that when a computing system displays the video segment on a display the list of hidden objects is viewable to the user of the computing system that views the video segment with the hit-zones added. The hit-zone file can also include data corresponding to contextual information so that when a computing system displays the video segment on a display, the computing system also displays contextual information about one or more of the hidden objects in response to a user correctly identifying one of the hidden objects for which the contextual data is stored in the hit-zone file.

Certain embodiments are directed to one or more processor readable storage devices having instructions encoded thereon which when executed cause one or more processors to perform a method that enables user interaction with a video segment. Such a method can include receiving a video segment that is displayable on a display, and separately receiving a hit-zone file that includes hit-zone data corresponding to spatial regions that define hit-zones for hidden objects included in the video segment. The method can also include displaying the video segment and simultaneously utilizing the hit-zone data included in the hit-zone file to add hit-zones for the hidden objects included in the video segment. Additionally, the method can include accepting user inputs that indicate where a user thinks the hidden objects are located. For each of the user inputs accepted, which indicates where a user thinks one of the hidden objects is located, there can be a determination of whether or not the user correctly identified a hidden object and user feedback indicative thereof can be provided. In certain embodiments, in response to a user correctly identifying one of the hidden objects for which data corresponding to contextual information is included in the hit-zone file, the contextual information for the one of the hidden object is displayed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

What is claimed is:

1. On a computing device, a method for providing for user interaction with a video segment, comprising:
   providing the video segment to a plurality of computing systems so that the video segment is displayable on displays included in or coupled to the plurality of computing systems;
   providing, to the plurality of computing systems, instructions that request that users of the computing systems identify one or more objects within the video segment;
   obtaining, from each computing system of the plurality of computing systems, a user input of an indication of a spatial location of each of the one or more objects;
   identifying, for each of the one or more objects, a respective spatial area within the video segment that a highest percentage of the users of the computing systems identified as corresponding to the spatial location of the object;
   identifying, for each of the one or more objects, a respective spatial region that defines a hit-zone for the object based on the respective spatial area identified within the video segment;
   producing and storing via computer-readable storage hit-zone data that define the hit-zone for each of the one or more objects included in the video segment wherein the hit-zone data is stored separately from the video segment;
   receiving a request for the hit-zone data from a further computing system; and
   transmitting the hit-zone data to the further computing system so that the hit-zone data adds a hit-zone for each of the one or more objects included in the video segment;
   wherein the hit-zone data is transmitted separately from the video segment;
   wherein each hit-zone is defined by a different portion of the hit-zone data and corresponds to a different one of the included in the video segment than other hit-zones; and
   wherein the spatial region that defines the hit-zone for each of the one or more objects is configured not to be visible during presentation of the video segment with the hit-zone.

2. The method of claim 1, wherein producing and storing the hit-zone data also includes producing and storing a list of the objects such that the hit-zone data includes data corresponding to the list of the objects so that when a computing system displays the video segment on a display the list of objects is viewable to the user of the computing system that views the video segment with the hit-zones added.

3. The method of claim 1, wherein producing and storing the hit-zone data also includes producing and storing contextual information for one or more of the objects such that the hit-zone data includes data corresponding to the contextual information so that when a computing system displays the video segment on a display, the computing system also displays contextual information about one of the objects in response to a user correctly identifying one of the object for which the contextual data is stored in the hit-zone data.

4. The method of claim 1, wherein at least one of the spatial regions, that defines a said hit-zone, changes in shape, size and position over a span of the video segment.

5. The method of claim 4, further comprising automatically changing a shape, a size and a position of one of the spatial regions that defines a said hit-zone that changes in shape, size and position over the span of the video segment.

6. The method of claim 1, wherein:
   the hit-zone data is stored within a different data store than the video segment; and
   the hit-zone data is uploaded to a computing system separately from the video segment being uploaded to the computing system.

7. The method of claim 1, wherein:
   the video segment is produced and stored prior to producing and storing of the hit-zone data; and
   a producer of the hit-zone data differs from a producer of the video segment.

8. The method of claim 1, wherein the hit-zone data is produced in real-time or near real-time relative to when the video segment is produced.

9. The method of claim 1, wherein:
   a plurality of different hit zone data files comprising the hit-zone data are produced for the same video segment;
   one or more of the objects and the hit-zones defined therefor are different in the different hit-zone data files;
   at least two of the hit-zone data files are provided to a same computing system so that different interactive experiences are provided to a user of the same computing system that views the video segment at the different times.

10. One or more processor readable hardware storage devices having instructions encoded thereon which when executed cause one or more processors to provide for user interaction with a video segment by:
    providing the video segment to a plurality of computing systems so that the video segment is displayable on displays associated with the computing systems;
    providing, to the plurality of computing systems, instructions that request that users of the computing systems identify one or more hidden objects within the video segment;
    obtaining, from each computing system of the plurality of computing systems,
    a user input of an indication of a spatial location of each of the one or more objects;
    identifying, for each of the one or more objects, a respective spatial area within the video segment that a highest percentage of the users identified as corresponding to a spatial location of the object;
    identifying, for each of the one or more objects, a respective spatial region that defines a hit-zone for the object based on the respective spatial area identified area within the video segment;
    producing and storing, via the processor readable hardware storage device, a hit-zone data corresponding to the spatial region that defines a hit-zone for each of the one or more objects included in the video segment;

receiving a request for the hit-zone data from a further computing system; and transmitting the hit-zone data to the further computing system so that when the further computing system is used to display the video segment the hit-zone data adds a hit-zone for each of the one or more objects included in the video segment wherein the hit-zone data is transmitted separately from the video segment;

wherein each hit-zone is defined by a different portion of the hit-zone data and corresponds to a different one of the one or more objects included in the video segment than other hit-zones; and wherein the spatial region that defines the hit-zone for each of the one or more objects is configured not to be visible during presentation of the video segment with the hit-zone.

11. The one or more processor readable storage devices of claim 10, wherein the hit-zone data also includes data corresponding to contextual information for one or more of the objects.

12. The one or more processor readable storage devices of claim 10, wherein at least one of the spatial regions, that defines a said hit-zone, is configured to change in shape, size and position over a span of the video segment.

* * * * *